United States Patent [19] [11] Patent Number: 4,904,030
Ono [45] Date of Patent: Feb. 27, 1990

[54] RUBBER CRAWLER
[75] Inventor: Yoshihiko Ono, Kanagawa, Japan
[73] Assignee: Bridgestone Corporation, Tokyo, Japan
[21] Appl. No.: 224,044
[22] Filed: Jul. 25, 1988
[30] Foreign Application Priority Data
Jul. 24, 1987 [JP] Japan ................................. 62-185174
[51] Int. Cl.⁴ ............................................. B62D 55/24
[52] U.S. Cl. .................................. 305/35 EB; 305/56
[58] Field of Search .................. 305/35 R, 35 EB, 37, 305/38, 39, 53, 56, 57

[56] References Cited

U.S. PATENT DOCUMENTS 4,678,244  7/1987  Furuta et al. ..................... 305/38 X

FOREIGN PATENT DOCUMENTS 0118912  9/1984  European Pat. Off. .............. 305/38
0002925  1/1977  Japan ................................ 305/35 EB
0120462  9/1981  Japan ................................ 305/35 EB
0032576  2/1984  Japan ................................. 305/35 R
0075070  4/1986  Japan ................................ 305/35 EB
0122085  6/1986  Japan ....................................... 305/38

Primary Examiner—Russell D. Stormer
Attorney, Agent, or Firm—Jordan and Hamburg

[57] ABSTRACT

A rubber crawler comprises an endless rubber crawler belt which extends over a sprocket and an idler tumbler of a vehicle, and has a running surface formed on its inner circumference and on which a plurality of rollers roll, and a plurality of cores each having a base embedded in the belt and arranged perpendicularly to the longitudinal direction of the crawler belt at a proper mutual spacing longitudinally of the belt. Each core has an extended core part. The extended core part has a surface corresponding to the running surface along which the rollers are rolled, the core surface being wider longitudinally of the crawler belt than the width of the base of the core.

4 Claims, 4 Drawing Sheets

RUBBER CRAWLER

BACKGROUND OF THE INVENTION

1. Field of the Invention

The present invention relates to a rubber crawler comprising an endless rubber-crawler belt which extends over a sprocket and an idler tumbler of a vehicle and has a running surface formed on its inner circmference and on which rollers between the sprocket and idler tumbler roll, and also relates to a crawler belt in which many cores are embedded at the base thereof perpendicularly to the longitudinal direction of the crawler belt.

2. Description of the Prior Art

Conventionally, the vehicle of this type which uses a rubber crawler includes a sprocket 1, an idler tumbler 2, an endless rubber-crawler belt 100 which extends over the sprocket 1 and the idler tumbler 2, and a plurality of rollers 3 disposed interiorly of and in contact with the crawler belt 100 between the sprocket 1 and the idler tumbler 2 and which roll along the internal periphery of the crawler belt 100, as illustrated in FIG. 1.

Also as shown in FIG. 2, many cores 101 have the bases thereof embedded in the crawler belt 100 perpendicularly to the longitudinal direction of the crawler belt 100, and have guide projections 102 formed integrally thereon which protrude inwardly to form the inner circumference of crawler belt 100. Further, a tensile reinforcing member 103 such as steel cord or the like is embedded in the crawler belt 100 in such a manner as to surround the outer circumferences of the cores 101. Wheels 3A of which respective pairs compose each roller 3 roll on the inner circumference portions of the crawler belt 100 that are outside the guide projections 102. Sprocket holes 104 for allowing the teeth of the sprocket 1 to be fitted therein are made in the crawler belt 100 between the cores 101, as illustrated in FIG. 3.

Such prior vehicles however suffer from the following problems.

The wheels 3A of the rollers 3, which roll along the internal periphery of the crawler belt 100 alternately on the cores 101 and on a rubber surface between the cores 101 are often subjected to severe vertical motion since the rollers 3 fall onto the rubber surface when reaching that surface.

Additionally, on the internal surface of the crawler belt, 100 along which the rollers 3 are rolled the rubber tends to be stripped from the core 101 at the boundary between the rubber and the core 100 thereby to permit water and sand etc., to enter into the interior of the crawler belt from that boundary to increase the failure of the rubber. Moreover, when each core 101 is covered with only a thin sheet of rubber, that portion is damaged to thereby permit water and mud etc., to enter into that damaged portion 200 as illustrated in FIG. 4. In particular, in the so-called outer roller system, where the wheels 3A, respective pairs of which compose each roller 3, roll along the outside of the guide projections 102, the rubber located outside the projections 102 tends to be damaged. This can be prevented by making the rubber of the crawler belt 100 thicker, but that is not actually done.

SUMMARY OF THE INVENTION

In view of the drawbacks of the conventional rubber crawlers, it is an object of the present invention to provide a rubber crawler which is not damaged on the crawler belt internal periphery located on the core, i.e., the surface of the crawler belt along which each roller is rolled, and which does not cause vertical vibration of these rollers.

To achieve the above objects, the rubber crawler of the present invention includes a sprocket, an idler tumbler, a plurality of rollers, an endless rubber crawler belt which extends over the sprocket and the idler tumbler of a vehicle and has a running surface formed on its inner circumference and on which the rollers between the sprocket and the idler tumbler roll, and in the crawler belt in which many cores are embedded at the bases thereof perpendicularly to the longitudinally direction of the crawler belt the core further having a surface corresponding to the surface of the crawler belt along which rollers are rolled, the surface of the core is made wider that the base of the core longitudinally of the crawler belt. The rubber crawler of the present invention thus provides an extended core part having a surface corresponding to the surface along which rollers are rolled, the core surface being wider longitudinally of the crawler belt than the width of the base of the core. In the rubber crawler of the invention the aforementioned problems are thereby eliminated.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Referring now to FIGS. 5 to 17, embodiments of a rubber crawler according to the present invention are illustrated.

Figure 1:
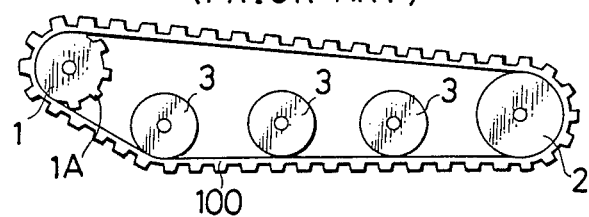
FIG. 1 is a side view illustrating a vehicle around which a prior rubber crawler is trained.
Figure 2:
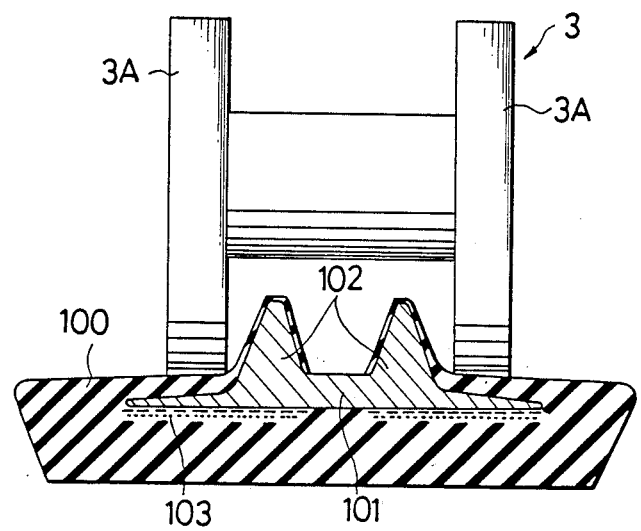
FIG. 2 is a front view in cross section illustrating the prior rubber crawler of FIG. 1.
Figure 3:
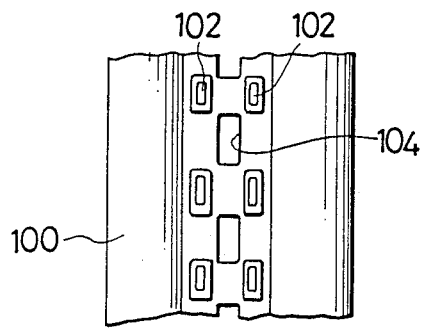
FIG. 3 is a plan view illustrating the prior rubber crawler of FIG. 1.
Figure 4:
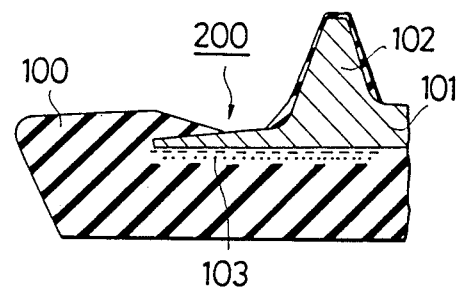
FIG. 4 is a cross sectional view illustrating the difficulty of the prior rubber crawler.
Figure 5:
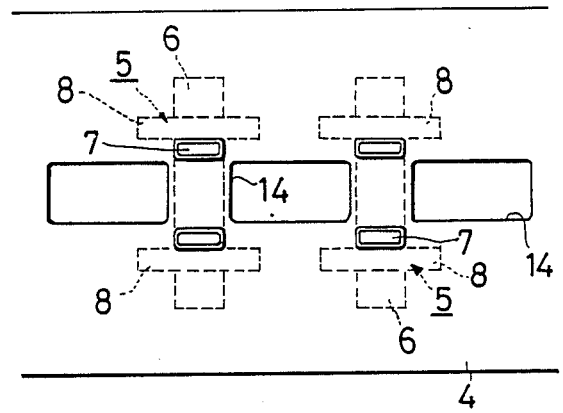
FIG. 5 is a plan view illustrating a preferred first embodiment of a rubber crawler according to the present invention.
Figure 10:
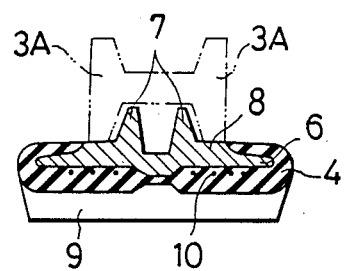
FIG. 10 is a front view in cross section of FIG. 8.
Figure 11:
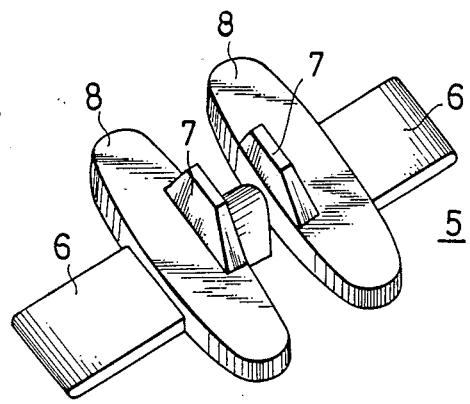
FIG. 11 is a perspective view illustrating a core.
Figure 12:
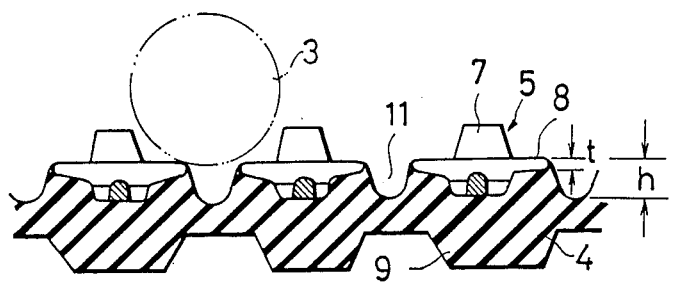
FIG. 12 is a side view in cross section illustrating other embodiment of the present invention.

FIG. 5 illustrates a first embodiment of a rubber crawler of the invention, in which the rubber crawler extends over a sprocket 1 and an idler tumbler 2 of a vehicle shown is FIG. 1. The rubber crawler includes an endless rubber crawler belt 4 having a running surface along which a plurality of rollers 3 are rolled forwardly and backwardly, and a plurality of cores 5 having bases 6 embedded in the belt, the cones 5 being mutually spaced a proper distance longitudinally of the belt. The core 5 includes, as best illustrated in FIGS. 10 and 11, a pair of guide projections 7 and a pair of corresponding extended core parts 8, each having greater width than that of the base 6 of the core 5 longitudinally of the crawler belt 4 and being formed on both sides of those guide projections 7. Additionally, a plurality of lugs 9 are formed on the outer periphery of the crawler belt 4.

And, a reinforcing member 10 such as steel cords is embedded in the crawler belt 4 so as to surround the outer periphery of the cores 5 embedded in the crawler belt 4. When wheels 3A, a pair of which compose each roller 3, roll on portions of the inner circumference of the crawler belt 4 that are outside the guide projections 7, wheels 3A roll on the extended core parts 8 of the core 5, as illustrated in FIG. 10.

Figure 6:
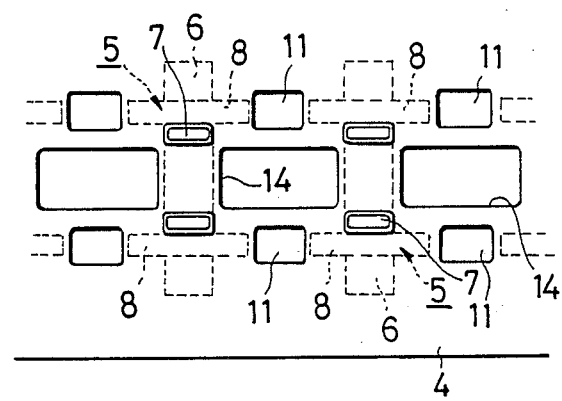
FIG. 6 is a plan view illustrating a second embodiment of the rubber crawler of the present invention.

FIG. 6 illustrates a second embodiment. In the second embodiment, a concave portion 11 is formed in the crawler belt 4 between any two adjacent cores 5 located on the passing surface on which the rollers pass. The depth h of the concave portion 11 is preferably greater than the thickness t of the extended core part 8.

Figure 7:
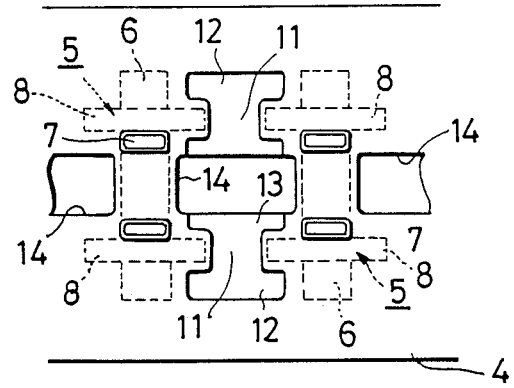
FIG. 7 is a plan view illustrating a third embodiment of the same.
Figure 8:
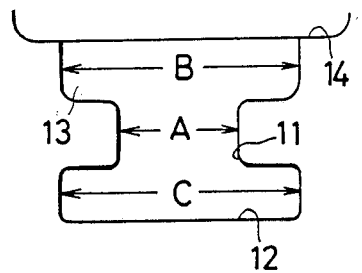
FIG. 8 is an enlarged plan illustrating or concave portion and large-sized concave portion.
Figure 9:
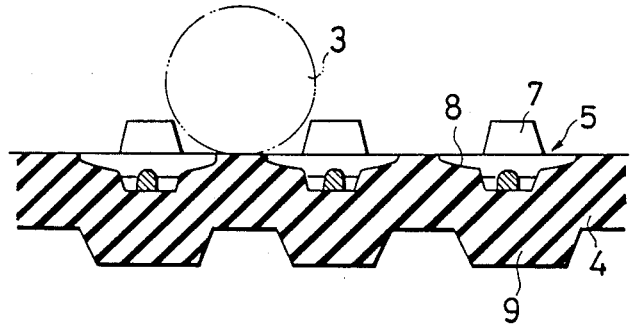
FIG. 9 is a side view in cross section of FIG. 8.
Figure 13:
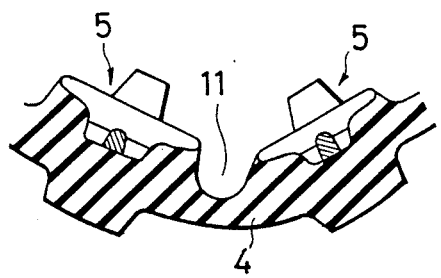
FIGS. 13 and 14 are cross sections each illustrating the effect of the concave portion formed in a crawler belt according to the present invention when the crawler belt is bent.
Figure 14:
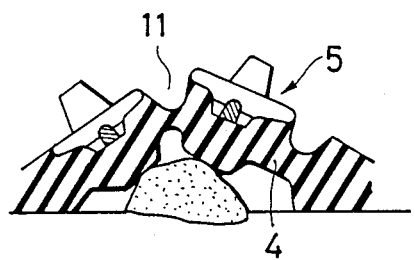

Referring further here to FIG. 7, a third embodiment is illustrated, wherein large-sized concave portions 12 and 13 are formed adjoining both ends of the concave portion 11 widthwise of the crawler belt 4 and continuously with the concave portion 11, which large-sized concave portions 12 and 13 have their lengths B and C in the longitudinal direction of the crawler shoe 4 respectively greater than the length A of the concave portion 11 (B>A, C>A), as also shown in FIG. 8. Here, a numeral 14 in FIGS. 5 and 6 designates a sprocket hole. The large-sized concave portions 12 and 13 are not necessarily required to be two. Only one may be provided, on the side of the sprocket hole 14 (i.e., the large-sized concave portion 13). Such the concave portion 11 prevents, as illustrated in FIG. 13, the boundary between the core 5 and the rubber of the crawler belt 4 from being subjected to fatigue and separation when the crawler belt 4 is inwardly deflected at portions where the sprocket 1 or the idler tumbler 2 are located. Moreover, such a concave portion 11 prevents the rubber and core 5 from being separated at their boundary also when the side of the crawler belt 4 which makes contact with the ground rides up onto a stone, etc., as illustrated in FIG. 14.

Figure 15:
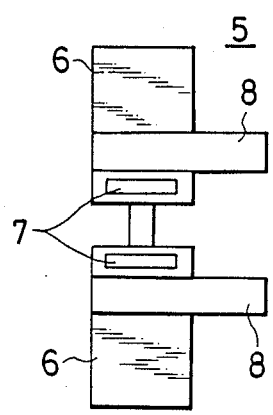
FIGS. 15 and 16 are plan views each illustrating another example of the core.
Figure 16:
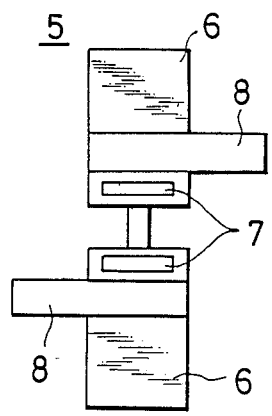

FIG. 15 illustrates another modification of the core 5 where each extended core part 8 is extended to only one side with respect to the base 6 of the core 5. Likewise, FIG. 16 illustrates still another modification of the core 5 where the extended core parts 8 are extended oppositely.

Figure 17:
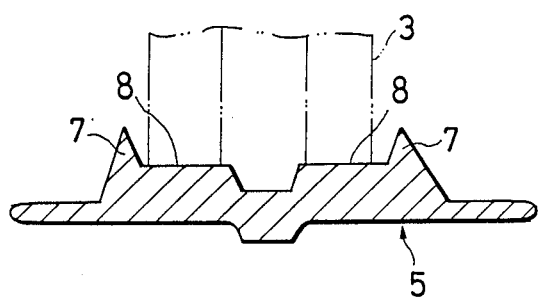
FIG. 17 is a cross sectional view illustrating of core of yet another embodiment.

FIG. 17 illustrates another modification of the extended core parts 8, in which the extended core parts 8 are formed inside of a pair of guide projections 7.

Although certain preferred embodiments have been shown and described, it should be understood that changes and modifications may be made therein without departing from the scope of the appended claims.

What is claimed is:

1. An endless crawler for mounting on a vehicle having rollers, the crawler having interior entirely coplanar running surfaces for rolling upon by the rollers and comprising an endless rubber belt and a plurality of cores arranged in the belt at predetermined intervals longitudinally with respect to the belt, each of the cores having a base embedded in the belt below the running surfaces, guide projections formed on the base and projecting from the base to above the running surfaces and extensions formed on the base, extending from the base longitudinally with respect to the belt and each having an exposed surface constituting a portion of the running surfaces.

2. An endless crawler according to claim 1, further comprising a respective concavity formed in the belt between each two projections which are mutually adjacent longitudinally of the belt, each concavity defining a discontinuity in the running surfaces.

3. An endless crawler according to claim 1, in which each concavity extends laterally and longitudinally relative to the belt to each side of said respective two projections.

4. An endless crawler according to claim 1, further comprising holes formed through the belt and adapted for engagement with a sprocket mounted on the vehicle, each respective one of the holes being located between the projections of each mutually adjacent two cores and each concavity extending laterally and longitudinally relative to the belt to a side of said projections closer to the hole than the other side of said projections.

* * * * *